July 8, 1924.
D. FASOLD
HOOK
Filed July 27, 1922
1,500,446
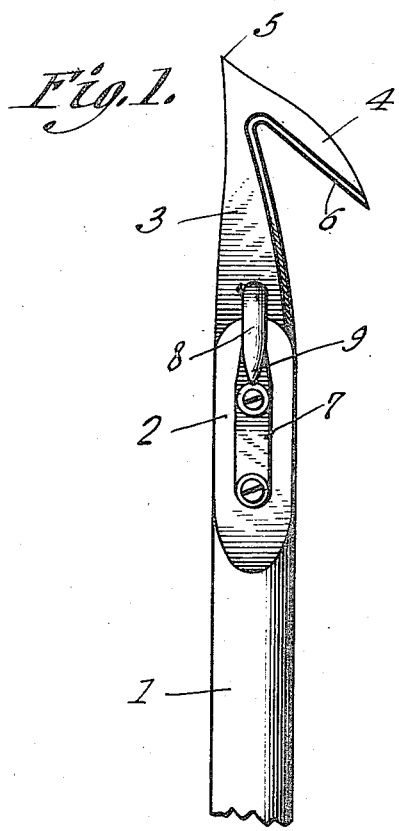
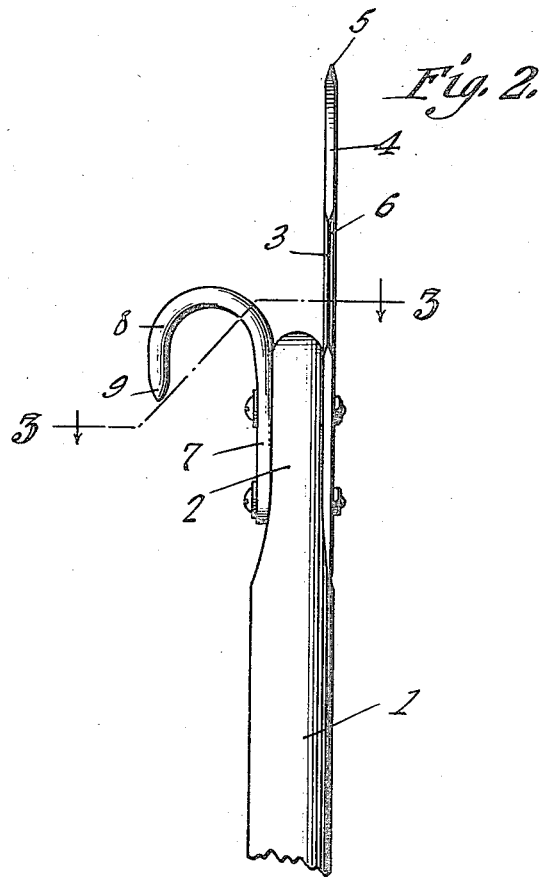
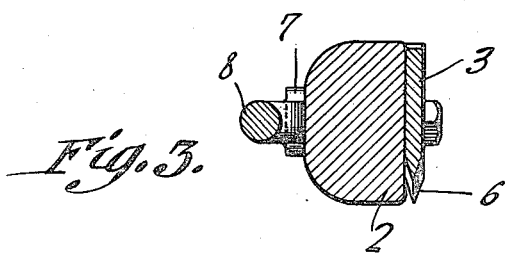
Inventor
D. Fasold
By CASnowlo.
Attorney Patented July 8, 1924.

1,500,446

UNITED STATES PATENT OFFICE.

DANIEL FASOLD, OF KESWICK, IOWA.

HOOK.

Application filed July 27, 1922. Serial No. 577,951.

*To all whom it may concern:*

Be it known that I, DANIEL FASOLD, a citizen of the United States, residing at Keswick, in the county of Keokuk and State of Iowa, have invented a new and useful Hook, of which the following is a specification.

The device forming the subject matter of this application is adapted to be used for pruning trees and bushes and the invention aims to provide novel means whereby the material which has been pruned off may be picked out readily, after the pruning operation has been completed. Another object of the invention being so to construct the pruning hook that the same may be thrust into the ground, thereby enabling the device to be used in cutting off limbs which are located close to the ground.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:—

Figure 1 shows in side elevation, a device constructed in accordance with the invention; Figure 2 is an elevation wherein the device is viewed at right angles to the showing of Figure 1; Figure 3 is a cross section on the line 3—3 of Figure 2.

The device forming the subject matter of this application includes a handle 1 of any desired length, having a thinned end 2. A pruning hook is provided, the same including a shank 3 and a bill 4, the shank being disposed against one side of the thinned end 2 of the handle 1. The bill 4 is disposed at an acute angle to the shank 3, the outer edge of the bill and the outer edge of the shank coacting to form a point 5 enabling the pruning hook to be thrust into the ground readily when it is desired to trim off a limb which is located relatively near to the surface of the ground. The inner edge of the shank 3 and the adjacent edge of the bill 4 are sharpened to a cutting edge as shown at 6.

A second hook is provided, the same including a shank 7 and a curved bill 8, the bill being pointed, if desired, as indicated by the reference numeral 9. The shank 7 of the last specified hook is placed against the thinned end 2 of the handle 1, securing elements 10 passing through the end 2 of the handle 1 and through the shanks 3 and 7 of the hooks to hold the hooks in place on the handle 1. The hooks 7—8 is disposed at a plane approximately at right angles to the plane in which the hooks 3—4 is located.

In practical operation, a branch may be lopped off readily by means of the hooks 3—4, since this hook has a cutting edge 6. After the branch has been cut off, the branch may be picked out by means of the hook 7—8. Very often, the hook 7—8 may be used to advantage in holding down a twig or branch, whilst another twig or branch is being severed through the instrumentality of the hook 3—4.

What is claimed is:—

In a device of the class described, a handle, and upper and lower hooks on the handle, the hooks being disposed in planes approximately at right angles to each other and being spaced apart longitudinally of the handle, the upper hook being so constructed as to serve as a cutting hook, and the lower hook being so constructed as to function exclusively as a holding hook.

In testimony that I claim the foregoing as my own, I have hereto affixed my signature in the presence of two witnesses.

DANIEL FASOLD.

Witnesses:
A. A. HUNGERFORD,
ALVA HUNGERFORD.